United States Patent [19]
Abe

[11] Patent Number: 5,271,367
[45] Date of Patent: Dec. 21, 1993

[54] IGNITION TIMING CONTROL SYSTEM FOR AN ENGINE

[75] Inventor: Kunihiro Abe, Tokyo, Japan

[73] Assignee: Fuji Jukogyo Kabushiki Kaisha, Tokyo, Japan

[21] Appl. No.: 382,301

[22] Filed: Jul. 20, 1989

[30] Foreign Application Priority Data

Jul. 26, 1988 [JP] Japan .................. 63-187768

[51] Int. Cl.$^5$ ........................................ F02P 5/15
[52] U.S. Cl. ........................... 123/418; 123/421; 123/424
[58] Field of Search ............ 123/417, 418, 421, 424

[56] References Cited

U.S. PATENT DOCUMENTS

| | | | |
|---|---|---|---|
| 4,351,297 | 9/1982 | Suematsu | 123/424 X |
| 4,489,691 | 12/1984 | Ono et al. | 123/424 |
| 4,570,596 | 2/1986 | Sato | 123/424 X |
| 4,694,799 | 9/1987 | Yagi et al. | 123/425 |

FOREIGN PATENT DOCUMENTS 60-47877 3/1985 Japan .

Primary Examiner—Tony M. Argenbright
Attorney, Agent, or Firm—Beveridge, DeGrandi & Weilacher

[57] ABSTRACT

There is disclosed an ignition timing control system for an engine, capable of adjustably setting a timing for shifting from a fixed ignition timing after complete firing to an ordinary ignition timing. The control system comprises an ignition timing setting unit for setting an ignition timing from an ignition timing map using an engine load and the engine speed, a complete firing judgment unit for judging a complete combustion from conditions of the engine, and a delay setting element for setting a delay time for switching the fixed ignition timing to predetermined ignition timing at the time of starting in dependency on the engine temperature when the complete firing is judged.

14 Claims, 6 Drawing Sheets

IGNITION TIMING CONTROL SYSTEM FOR AN ENGINE

BACKGROUND OF THE INVENTION

The present invention relates to an ignition timing control system for an engine, and more particularly to the timing control system for shifting from a fixed ignition timing after complete firing to an ordinary ignition timing control in dependency on an engine temperature.

Heretofore, for the ignition timing control system of this kind, there is an angular control method to detect projections or slits provided on a crank rotor rotating in synchronism with a crank shaft to messure an ignition timing as disclosed in e.g., Japanese Patent Application Laid-Open 61-96181. In addition, there is a time control method to detect passing time between the projections or slits provided on the crank rotor at predetermined intervals to measure an ignition timing as disclosed in Japanese Patent Laid-Open 60-47877, etc.

Meanwhile, because an engine speed at the time of cranking is unstable, many systems have a measure to fix the ignition timing at position before top dead center (BTDC) 10° at the time of cranking and then to advance an ignition angle after starting the engine to shift to an ordinary ignition timing. Generally, a timing for shifting to such an ordinary ignition timing is uniformly switched to the ordinary ignition timing when a starter switch is switched from an ON to an OFF state in dependency on the engine speed.

In an ordinary operating state where the engine speed is stable, the time control method is more advantageous than the angle control method in various aspects, i.e. fast computing speed and simple structure. However, for an unstable initial or start-up time period immediately after starting, it is difficult to precisely detect changes in the engine speed.

Namely, as shown by fixed ignition time period at the time of cranking in FIG. 1 and the ignition timing control immediately after starting in FIG. 2, projections 1a and 1b are formed at an outer periphery of a crank rotor 1, e.g., at positions of BTDC 10° and BTDC 100°. At the time of cranking, when a crank pulse produced in response to detection of the projection 1a is output for the fixed ignition timing, an ignition signal is output to an ignition drive means (not shown) to spark an ignition plug (state of FIG. 1).

On the other hand, when the starter switch is turned OFF after complete firing, or when the engine speed rises to a predetermined value, the ignition timing control is switched to the ordinary ignition timing control. First, an angular velocity is calculated from a time period $\alpha$ from the time when the projection 1a is detected to the time when the projection 1b is detected to convert an ignition angle set depending upon the operating state to an ignition timing in accordance with a calculated angular velocity, thus to measure the ignition timing using the time when the projection 1b is detected as a reference time point. When the time reaches a predetermined ignition timing (BTDC 20° in FIG. 2), an ignition signal is output.

However, the combustion characteristics generally vary in dependency on a combustion temperature. For example, firing at the initial time of complete firing at a high engine temperature is relatively stable. Accordingly, the shift of the ignition timing is relatively fast from the fixed position and to the ordinary ignition timing position and permits a smooth start-up characteristic. On the other hand, where the engine temperature is low such as in a cold starting, combustion becomes unstable also after complete firing. Particularly, in the case of an extremely low engine speed immediately after starting the engine, an interval of the time period $\alpha$ is prolonged. When the engine speed for this time period varies to much degree, even if the ignition timing is at BTDC 20° as shown in FIG. 2, an actual ignition angle may be excessively advanced to an extent of BTDC 30°.

As a result, when the ignition timing is suddenly advanced from the fixed ignition timing when starting the engine in the cold state, the engine speed is not smoothly increased. Consequently, engine stall would occur, thus making it difficult to obtain a satisfactory starting performance.

In addition, when switching timing of such an ignition timing is set in correspondence with the cold state, the ignition timing control at a low engine speed at a high engine temperature is not suitably conducted, resulting in the problem that a satisfactory starting or restarting performance cannot be obtained.

SUMMARY OF THE INVENTION

The present invention has been made in view of the above circumstances. The object of the present invention is to provide an ignition timing control system for an engine for a time control, wherein the system is capable of adjustably setting the timing for switching from a fixed ignition timing to an ordinary ignition timing in dependency on an engine temperature, resulting in a satisfactory starting performance.

The ignition timing control system for the engine according to the present invention comprises ignition timing setting means for setting an ignition timing from an ignition timing map using an engine load and an engine speed, respectively, complete firing judgement means for judging a complete firing from conditions of the engine, and delay setting means for setting a delay time for switching the fixed ignition timing to an ordinary ignition timing in dependency on a engine temperature when the engine is judged to be in a complete firing state.

DETAILED DESCRIPTION OF THE PREFERRED EMBODIMENTS

Preferred embodiments according to the present invention will be described in detail with reference to the attached drawings.

Figure 1:
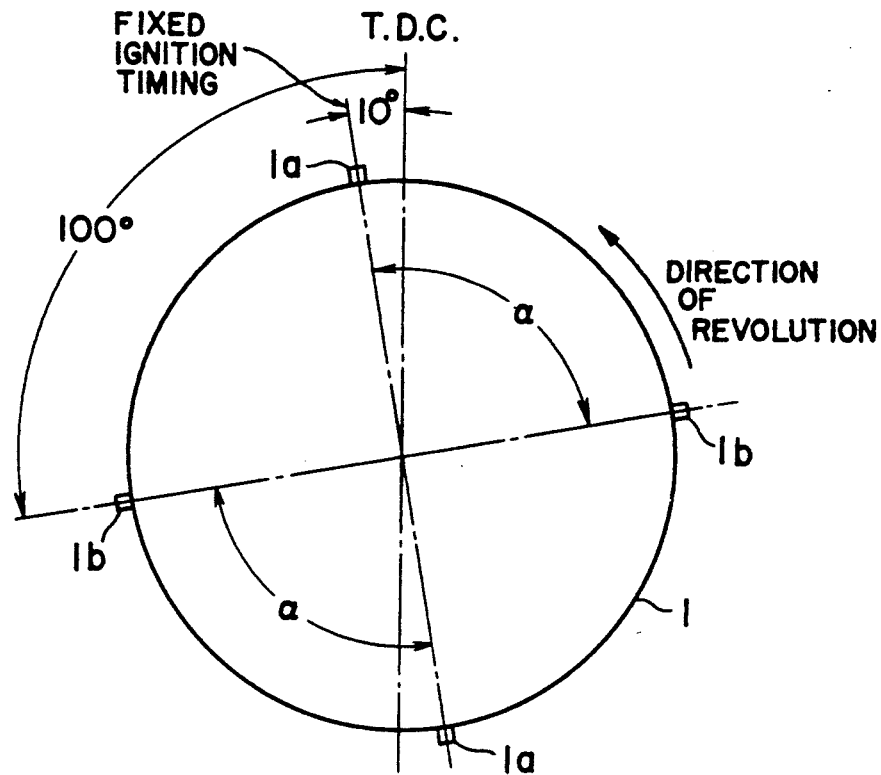
FIGS. 1 and 2 are front views of a conventional timing control system based on a time control.
Figure 2:
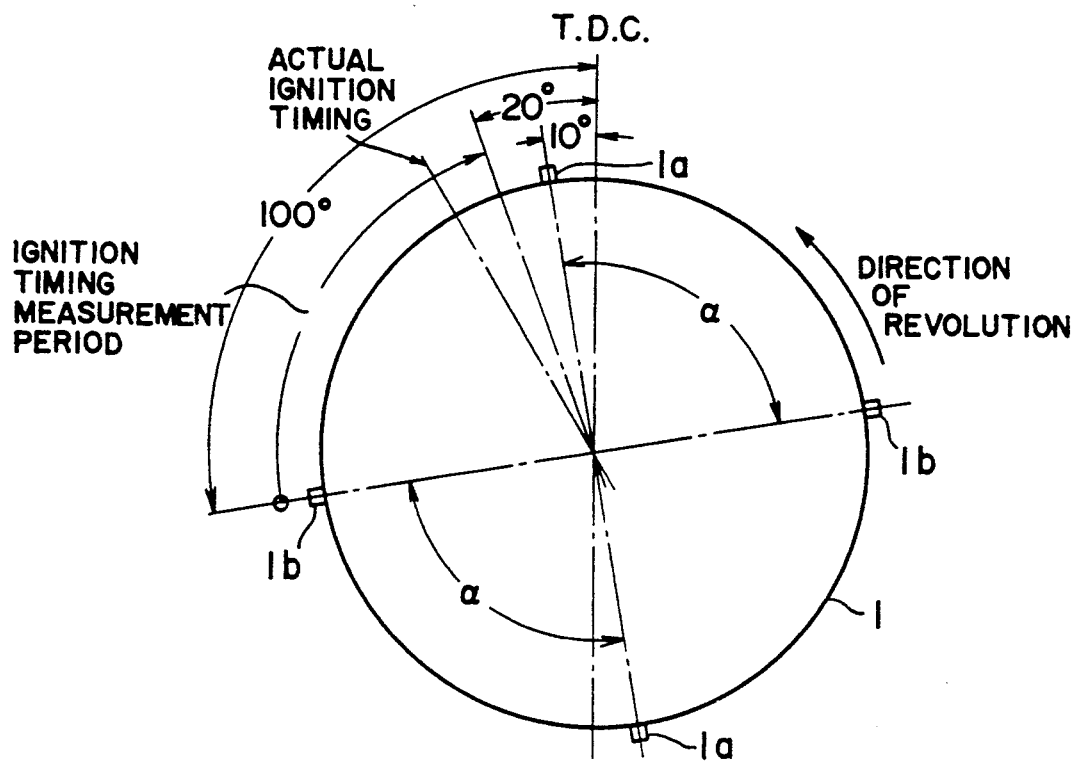
Figure 3:
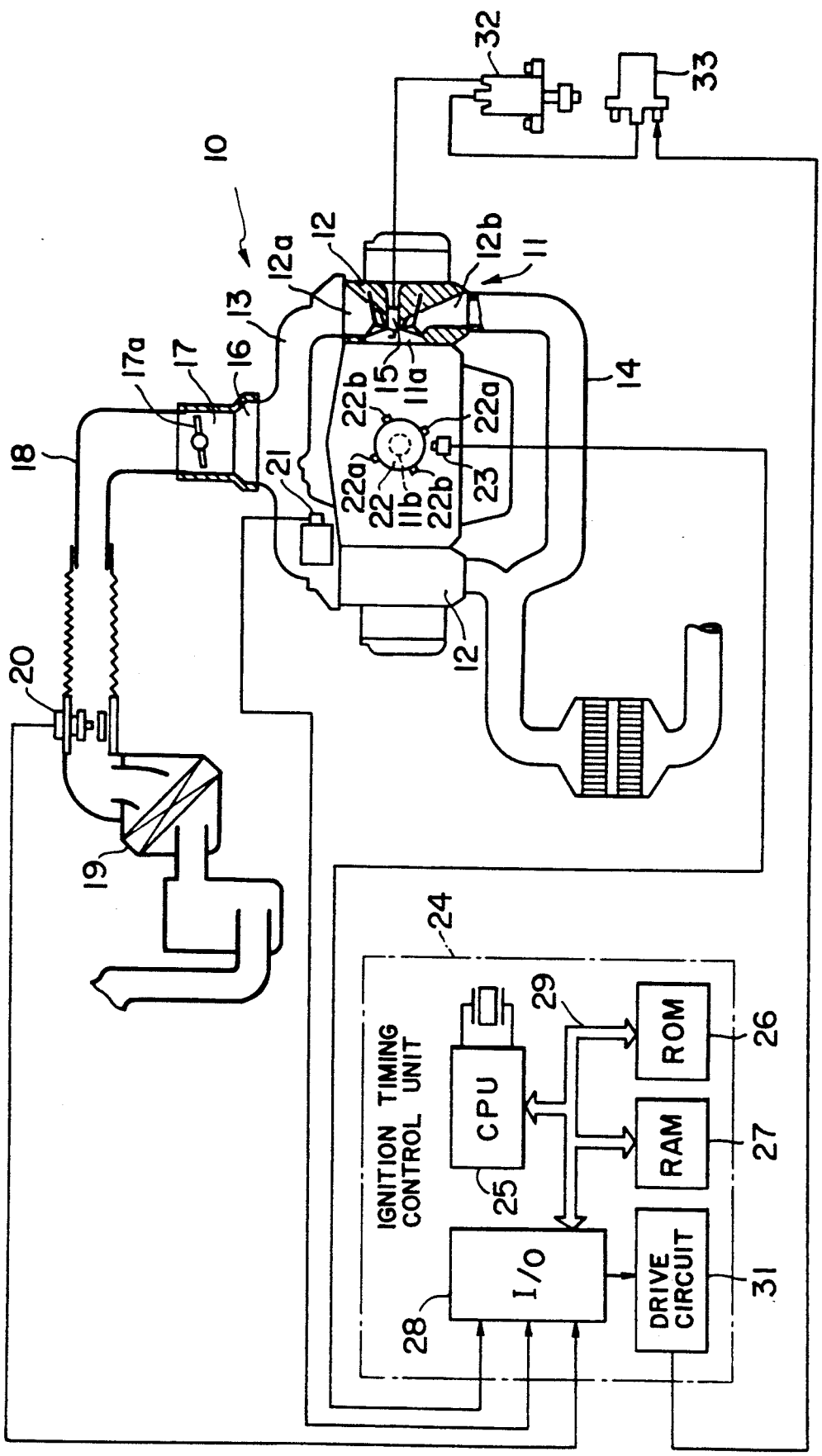
FIG. 3 is a block diagram showing an engine control system.

FIGS. 3 to 7 are views for explaining an embodiment according to the present invention. FIG. 3 shows a control unit 24 attached to an engine 10 with horizontally opposed four cylinders. In this figure, the engine 10 comprises a cylinder block 11, a cylinder head 12, an intake manifold 13 and an exhaust manifold 14. The cylinder head 12 includes an intake port 12a to which the intake manifold 13 is connected and an exhaust port 12b to which the exhaust manifold 14 is connected. Further, an ignition plug 15 is secured on the head 12, and an igniting portion of the plug 15 is exposed to a combustion chamber 11a of the block 11.

An air chamber 16 connects the intake manifold 13 with a throttle chamber 17 having a throttle 17a. The throttle chamber 17 is connected to an intake pipe 18 connected to an air cleaner 19 upstream side thereof. Furthermore, an intake air flow sensor 20 is secured in the vicinity of the air cleaner 19 within the intake pipe 18. As shown in FIG. 3, a hot wire type air flow meter is used as a sensor 20.

The intake manifold 13 includes a coolant passage (not shown). A coolant temperature sensor 21 is provided within the coolant passage.

Furthermore, the cylinder block 11 also includes a crank shaft 11b. The crank shaft 11b includes a crank rotor 22 fixed on an end thereof. The rotor 22 includes projections 22a as a reference point for calculating an angular velocity, and projections 22b indicating reference crank angles of respective cylinders. One projection 22a indicates each reference point of cylinders of No. 1 and No. 2, and the other projection 22a leading by an angle of 180 degrees indicates each reference point of cylinders of No. 3 and No. 4. One projection 22b that leads the projection 22a as the reference point of the cylinders No. 1 and No. 2 by an angle of 90 degrees indicates a crank angle of the cylinders of No. 1 and No. 2. The other projection 22b leading by an angle of 180 degrees from the projections of No. 1 and No. 2 cylinders indicates the crank angle of the cylinders of No. 3 and No. 4. These projections 22a and 22b are shown in detail in FIG. 4. Namely, in this figure, a set angle $\theta 1$ of the projection 22a is BTDC 10°, and a set angle $\theta 2$ of the projection 22b is BTDC 100°.

Figure 4:
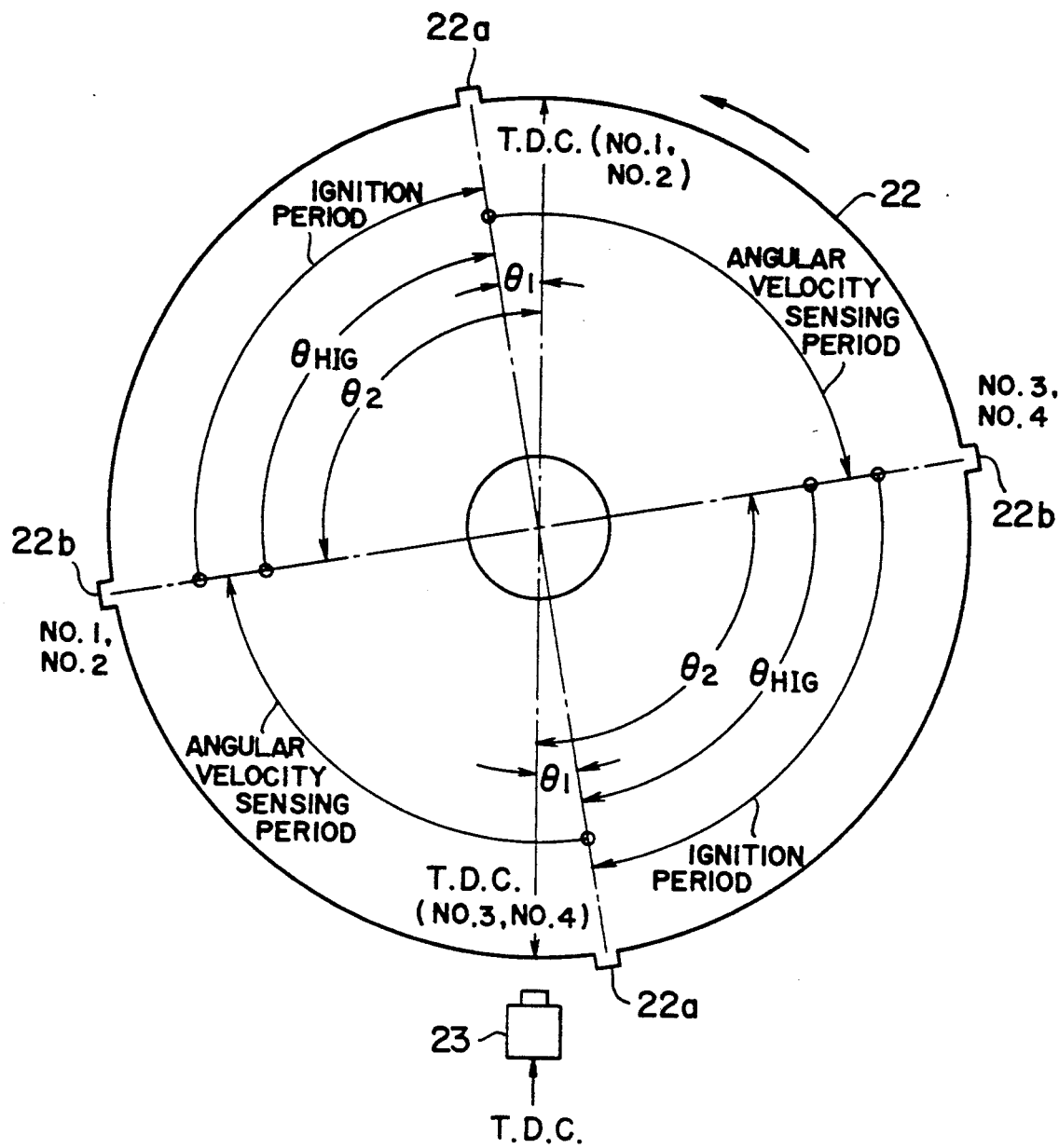
FIG. 4 is a front view showing a crank rotor of the ignition timing control system according to the embodiment shown in FIG. 3.

As shown in FIGS. 3 and 4, a crank angle sensor 23 comprising an electromagnetic pick-up is disposed at a position facing the outer periphery of the rotor 22. The sensor 23 includes a head for detecting change in the magnetic flux produced when the projections 22a and 22b pass through the sensor 23, and a signal generator for converting the change in magnetic flux detected to an a.c. voltage. The generator outputs a rotational angle signal Ne for detecting an engine speed and a crank angular velocity and a reference crank angle signal G for detecting a reference crank angle per each cylinder.

Figure 5:
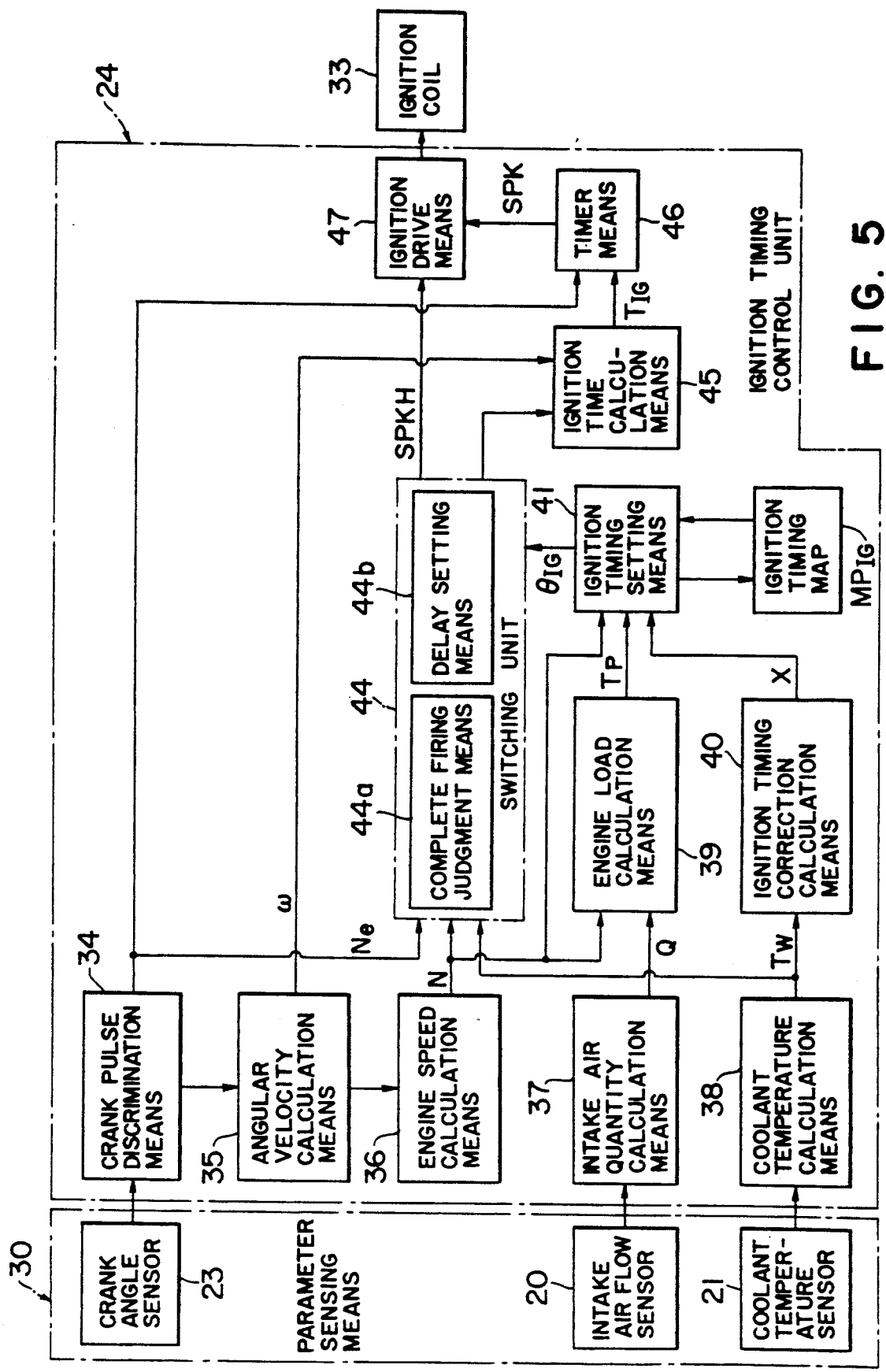
FIG. 5 is a block diagram showing the control system shown in FIGS. 3 and 4.

The intake air flow sensor 20, the coolant temperature sensor 21, and the crank angle sensor 23 are connected to the ignition timing control unit 24. The control unit 24 includes a central processing unit (CPU) 25 for performing a predetermined computation in dependency on various information sensed by the sensors 20, 21 and 23, a read only memory (ROM) 26 for holding fixed data such as control programs for the CPU 25 and an ignition timing map $MP_{IG}$, a random access memory (RAM) 27 for storing various data for data processing, an input/output (I/O) interface 28 responsive to the sensors 20, 21 and 23, a bus line 29 interconnecting the CPU 25, the ROM 26, the RAM 27, and the I/O interface 28 each other and a drive circuit 31 connected to an output port of the I/O interface 28. The sensors 20, 21 and 23 constitute operating parameter sensing means 30 as shown in FIG. 5. The drive circuit 31 is connected to a distributor 32 through an ignition coil 33, and the distributor 32 is connected to the ignition plug 15 (see FIG. 3).

As shown in FIG. 5, the ignition timing control unit 24 comprises crank pulse discrimination means 34, angular velocity calculating means 35, engine speed calculating means 36, intake air quantity calculation means 37, coolant temperature calculation means 38, engine load calculator 39, ignition timing correction quantity calculator 40, ignition timing setting means 41, the ignition timing map $MP_{IG}$, switching unit 44 as an ignition switching timing setting means, ignition time calculation means 45, timer means 46 and ignition drive means 47.

The crank pulse discrimination means 34 discriminates whether an output signal from the crank angle sensor 23 is the signal G produced in response to detection of the projection 22b of the crank rotor 22 or the signal Ne produced in response to detection of the projection 22a by a signal produced in response to detection of a projection of a cam rotor rotating in synchronism with a cam shaft (not shown).

Thus, the cam rotor rotating in synchronism with the cam shaft makes one-half of the revolution during one revolution of the crank rotor 22. By detecting projections formed equiangularly every 90 degrees on an outer periphery of the cam rotor, it is possible to predict what signal is output from the crank angle sensor 23 after any projection of the cam rotor is detected.

The angular velocity calculating means 35 calculates a time $T\theta$ from the time when the rotational angle signal Ne discriminated by the crank pulse discriminator 34 is detected to the time when next reference crank angle signal G is detected. Then, this calculating means 35 calculates an angular velocity $\omega$ of the crank shaft 11b from angular data between the projections 22a and 22b of the crank rotor 22 stored in advance in the ROM 26.

The engine speed calculating means 36 calculates the engine speed N from the angular velocity $\omega$ calculated in the angular velocity calculator 35.

The intake air flow calculating means 37 calculates a volume of an intake air, i.e., an intake air quantity Q passing through the intake pipe 18 in dependency on an output signal from the intake air flow sensor 20.

The coolant temperature calculating means 38 calculates a coolant temperature Tw from an output signal from the coolant temperature sensor 21.

The engine load calculation means 39 calculates a fundamental fuel injection quantity Tp ($Tp = K \times Q/N$, K . . . constant) from the engine speed N calculated at the engine speed calculating means 36 and the intake air quantity Q calculated at the intake air quantity calculating means 37 to output it. This fundamental fuel injection quantity Tp corresponds to an engine load.

The ignition timing correction calculating means 40 calculates an ignition timing correction quantity X corresponding to data such as the coolant temperature Tw calculated at the coolant temperature calculation means 38.

The ignition timing setting means 41 specifies an area of the ignition timing map MP$_{IG}$ stored in the ROM 26. As respective parameters, the engine speed N calculate at the engine speed calculating means 36 and the fundamental fuel injection quantity Tp as the engine load calculated at the engine load calculating means 39. The ignition timing setting means 41 retrieves or searches an ignition timing (ignition angle) $\theta$IG stored in this area and corrects the ignition timing $\theta$IG by using the ignition timing correction quantity X calculated at the ignition timing correction quantity calculation means 40 to set a new ignition timing $\theta$IG ($\theta$IG←$\theta$IG+X).

The switching unit 44 comprises complete firing judgment means 44a and delay setting means 44b. The complete firing judgment means 44a takes thereinto the engine speed N calculated at the engine speed calculation means 36 to make a comparison between the engine speed N and a reference engine speed NO (e.g., 500 r.p.m.) set in advance. When the engine speed N exceeds the reference engine speed NO (N≧No), the complete firing judgment means 44a judges the engine 10 to be in a complete firing state.

The delay setting means 44b is provided with the coolant temperature Tw calculated at the coolant temperature calculation mean 38 as an engine temperature when the engine 10 is judged to be in a complete firing state at the complete firing judgment means 44a. Then, the means 44b sets a delay time (delay timing), i.e., an ignition switching delay time for switching a fixed ignition timing SPKH to an ignition timing $\theta$IG for an ordinary timing control after complete firing in dependency on the coolant temperature.

Figure 6:
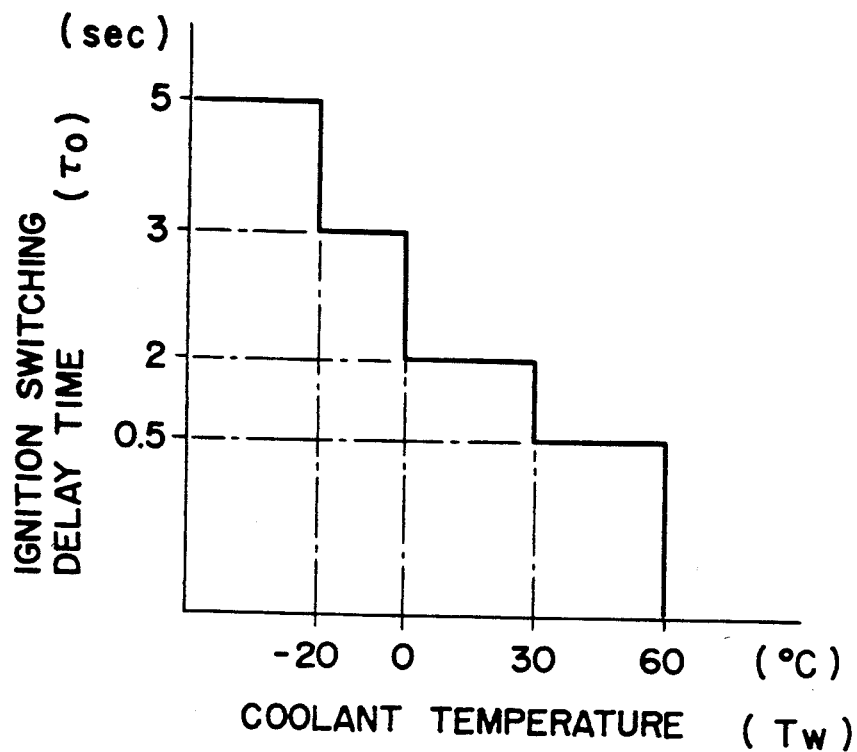
FIG. 6 is a characteristic diagram showing an ignition switching delay time in the control system shown in FIGS. 3 to 5.

For example, in this embodiment, as shown in FIG. 6, a range of the coolant temperature Tw is classified into five stages described below:

| |
|---|
| (1) Tw ≦ −20° C. |
| (2) −20° C. < Tw ≦ 0° C. |
| (3) 0° C. < Tw ≦ 30° C. |
| (4) 30° C. < Tw ≦ 60° C. |
| (5) 60° C. ≦ Tw |

The ignition switching delay time is set to the following values in dependency on the coolant temperature Tw:

| |
|---|
| (1) 5 sec. |
| (2) 3 sec. |
| (3) 2 sec. |
| (4) 0.5 sec. |
| (5) 0 sec. (switching immediately after complete firing) |

It is to be noted that each ignition switching delay time is set by calculating, the time from the complete firing to a stabilized combustion by an experiment in advance. The delay time is dependent upon the coolant temperature Tw. A set of such delay times are stored in advance in the ROM 26 as a table of count values TIMDLY corresponding to respective ignition switching delay times using the cooling water temperature Tw as a parameter.

The ignition switching timing setting unit 44 outputs the signal Ne in response to detection of the projection 22a (BTDC $\theta$1) of the crank rotor 22 as a fixed ignition signal SPKH to the driver 47. The signal Ne is output from the crank pulse discriminator 34 during delay time period after complete firing.

On the other hand, when a delay time $\tau$0 elapses after the complete firing, the switching unit 44 outputs the ignition timing $\theta$IG set at the ignition timing setting device 41 to the ignition time calculating means 45.

The ignition time calculating means 45 divides the ignition timing $\theta$IG output from the switching unit 44 by the angular velocity $\omega$ calculated at the angular velocity calculation means 35 to calculate an ignition timing TIG (TIG=$\theta$IG/$\omega$).

The timer means 46 starts counting the ignition timing TIG calculated at the ignition time calculator 45 using a signal G output from the crank pulse discriminator 34 as a trigger signal. When the count value reaches the ignition time TIG. the timer 46 outputs an ignition signal SPK to the ignition driver 47.

When the fixed ignition signal SPKH from the switching unit 44 or the ignition signal SPK from the timer 46 is input to the ignition drive means 47, a current flowing in the primary winding of the ignition coil 33 is cut off. Thus, the ignition plug 15 of the corresponding cylinder is sparked.

Figure 7:
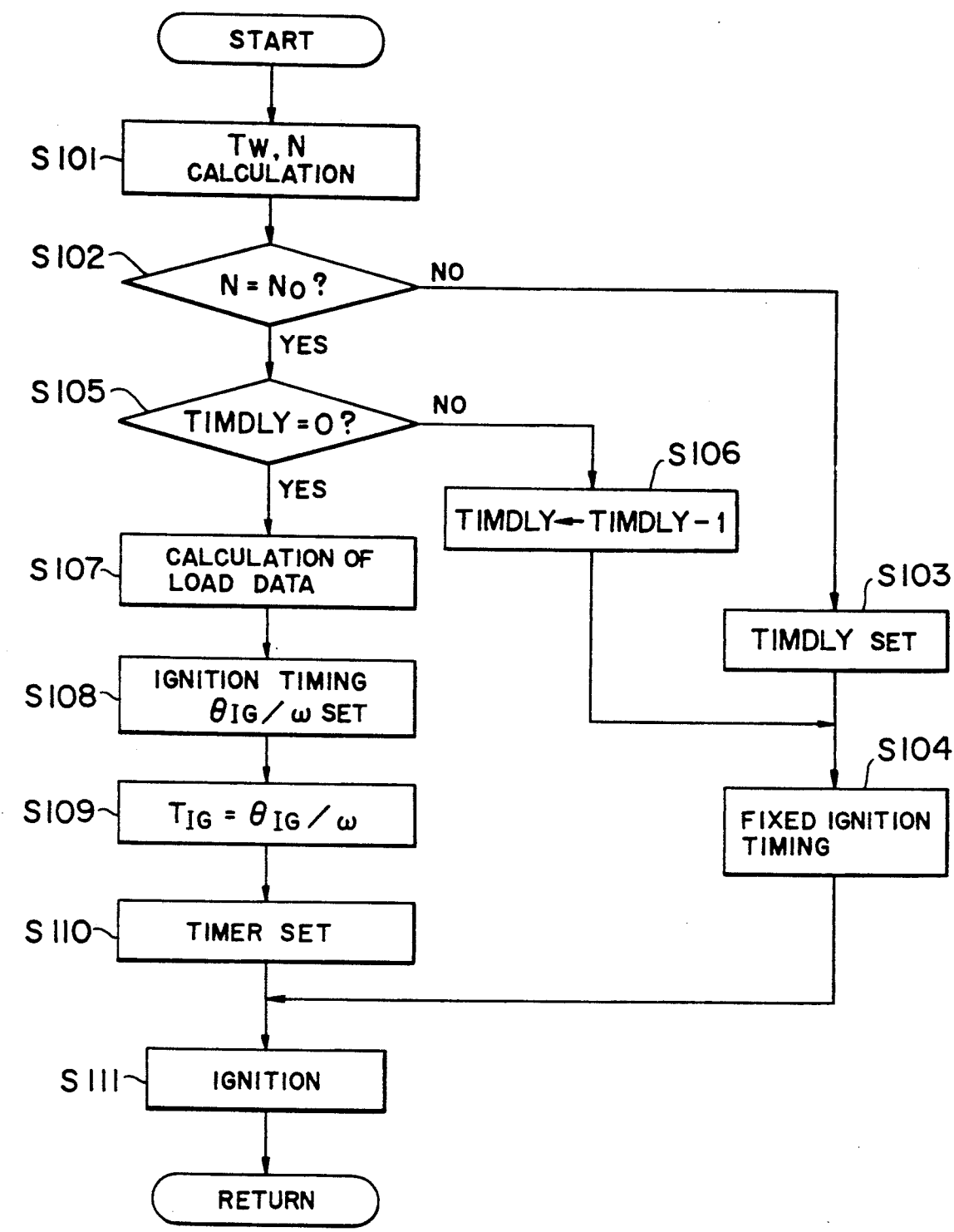
FIG 7. is a flow chart showing the ignition timing control shown in FIGS. 3 to 6.

The operation of the embodiment will be now described in accordance with the flowchart shown in FIG. 7. This program is executed per each cycle.

At the time of starting the engine, when the key switch is turned ON, the operation at a step S101 is first executed. Namely, the engine speed N is calculated in dependency on the output signal from the crank angle sensor 23, and the coolant temperature Tw is calculated in dependency on an output signal from the coolant temperature sensor 21 is calculated. Then, the program execution proceeds to a step S102 to make a comparison between the engine speed N calculated at the step S101 and the reference engine revolution number NO. (e.g., 500 r.p.m.) set in advance as a revolution number of the complete firing. As a result, when N<NO, it is judged that the engine does not reach the complete firing state. The program execution proceeds to a step S103. At this step, the count value TIMDLY corresponding to the ignition switching delay time $\tau$0 in dependency on the coolant temperature Tw calculated at the step S101. Then, the program execution proceeds to a step S104 to output the fixed ignition signal SPKH in synchronism with the signal Ne produced in response to detection of BTDC $\theta$1 (e.g., $\theta$1=10°) output from the crank pulse discriminator 34. At a step S111, a current flowing in the primary winding of the ignition coil 33 through the ignition drive means 47 is cut off to spark the ignition plug 15 of the corresponding cylinder. The program of one cycle is thus completed. The program execution returns to the step S101.

On the other hand, when it is judged at the step S102 that N≧NO, the engine 10 is judged to be in a complete firing state. The program execution advances to a step S105. At this step, a judgement is made as to whether a count value TIMDLY is equal to 0 (zero) or not. As a result, when the count value TIMDLY is not equal to 0, the program execution advances to a step S106. At this step, the current count value TIMDLY obtained by subtracting one (1) from the previous count value TIMDLY is set. Then, the program execution proceeds to the step S104 to perform an ignition timing control based on the fixed ignition timing. Until the count value TIMDLY becomes zero (0), the above-described routine is repeatedly executed.

Thus, immediately after the complete firing of the engine 10, the fixed ignition timing is conducted up to the count value set in dependency on the coolant temperature Tw immediately before the complete firing of the engine 10 at the step S103, in other words, during a period of the ignition switching delay time $\tau 0$.

When the count value TIMDLY is judged to be equal to zero at the step S105 and the ignition switching delay time $\tau 0$ elapses, it is judged that the combustion after complete firing becomes stable. Then, the program execution proceeds to the step S107. At this step, the control is switched to an ordinary ignition timing control. Thus, the fundamental fuel injection quantity (load data) Tp is determined by the intake air quantity Q based on the output signal from the intake air flow sensor 20 and the engine speed calculated at the step S101. Then, the program execution proceeds to a step S108. At this step, the ignition timing (ignition angle) $\theta IG$ is calculated directly or by the calculation from the ignition timing map $MP_{IG}$ for the load data Tp and the engine speed N as parameters, respectively. A corrective operation ($\theta IG \leftarrow \theta IG + X$) is applied to the ignition timing $\theta IG$ thus calculated by using the ignition timing correction quantity X based on the coolant temperature Tw calculated at the step S101.

Then, at a step S109, the ignition time TIG suitable for a current operating state is calculated from the angular velocity $\omega$ calculated in dependency on the output signal from the crank angle sensor 23 and the ignition timing $\theta IG$ calculated at the step S108 (TIG = $\theta IG/\omega$). At a step S110, the ignition time TIG calculated at the step S109 is set at the timer 46. Counting is initiated by using the signal G indicating the reference crank angle as the trigger signal. When the count value reaches the ignition time TIG, the ignition signal SPK is output. The current flowing in the primary winding of the ignition coil is cut off through the ignition drive means 47 to spark the ignition plug 15 of the corresponding cylinder through the distributor 32 (step S112). The program execution per cycle is thus completed and returns to the step S101.

As described above, the time at which switching from the fixed ignition timing immediately after complete firing to an ordinary ignition timing control is carried out is adjustably set in dependency on the coolant temperature Tw at the time of complete firing. Accordingly, at the low temperature, there is no possibility that switching from the unstable combustion state to the ordinary ignition timing control is suddenly conducted, thus making it possible to effectively prevent an engine stall, etc. Further, at the high temperature, switching to an ordinary ignition timing control can be conducted immediately after complete firing, leading to elimination of slow or insufficient operation. Consequently, the start-up of the engine is smoothly conducted, resulting in improved starting performance.

It is to be noted that while the engine temperature including the coolant temperature is sensed by a thermosensor secured at the cylinder block, it may be sensed directly by a temperature sensor within the cylinder.

Further, while the complete firing state is determined by the engine speed, it may be determined under the condition where the key switch is switched from ON to OFF, and another condition may be added thereto.

Figure 8:
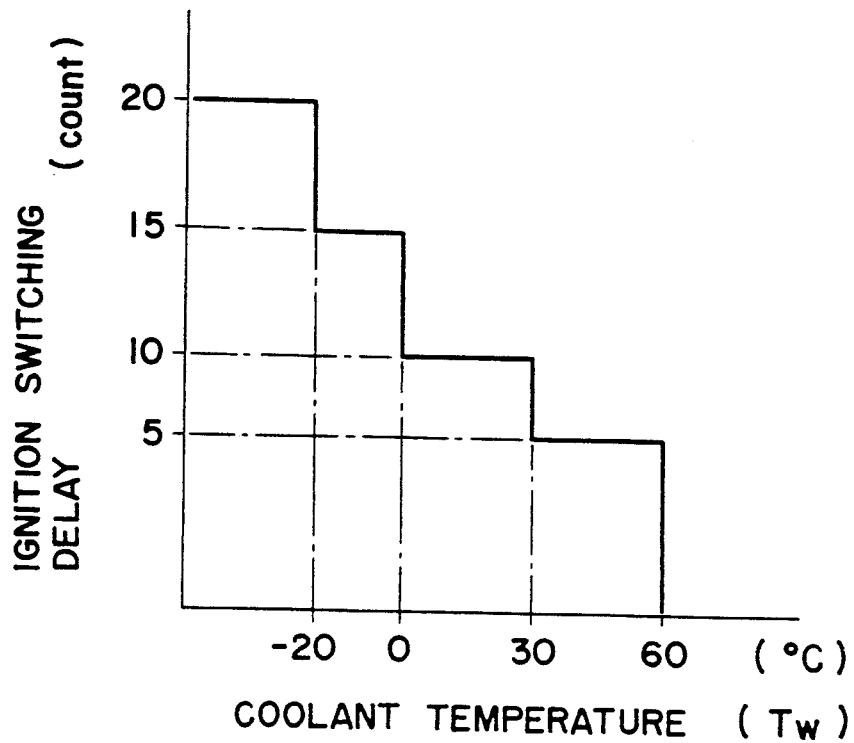
FIG. 8 is a characteristic diagram showing the ignition switching delay time in the ignition timing control system according to another embodiment of the present invention.

Furthermore, the delay time after complete firing may be set by counting the number of ignitions (five, ten, fifteen, and twenty times, etc.) set in dependency on the coolant temperature Tw as shown in FIG. 8 after complete firing.

It is further to be noted that while the fundamental fuel injection quantity Tp is used as load data in this embodiment, an intake pipe pressure or a throttle opening degree may be used as load data in place of such a fundamental fuel injection quantity.

Accordingly, even in an ignition timing control having the time control system, timing for switching from the fixed ignition timing to the ordinary ignition timing control side may be adjustably set in dependency on the engine temperature. Thus, the ignition timing control system can advantageously not only provide a satisfactory starting performance, but also smoothly increase the engine speed after the complete firing.

While the presently preferred embodiments of the present invention have been shown and described, it is to be understood that these disclosures are for the purpose of illustration and that various changes and modification may be made without departing from the scope of the invention as set forth in the appended claims.

What is claimed is:

1. An ignition timing control system to control an ignition timing for an engine having a crank rotor mounted on a crank shaft of said engine for indicating a revolution angle of said crank shaft, a crank angle sensor placed against said crank rotor for detecting said angle to indicate an engine speed, an intake air flow sensor provided in an intake pipe of said engine to detect an amount of intake air, and a coolant temperature sensor for detecting a temperature of said engine, the improvement of the system which comprising:
   angular velocity calculation means responsive to said crank angle sensor for calculating an angular speed of said crank shaft and for providing an angular velocity signal;
   engine load calculation means responsive to output signals of said engine speed and said intake air flow sensor, for determining a fundamental fuel injection amount;
   ignition timing correction means responsive to said coolant temperature for producing a correcting signal to correct said ignition timing;
   ignition timing setting means responsive to engine speed, said fundamental fuel injection amount and said correction signal for producing an ignition timing signal from an ignition timing map;
   complete firing judgment means responsive to said engine speed, said angular velocity and said coolant temperature for judging complete firing in said engine and for producing a discrimination signal; and
   delay setting means responsive to said discrimination signal and said ignition timing signal for switching a fixed ignition timing to a predetermined ignition timing in dependency on said temperature of the engine.

2. The ignition timing control system for the engine as set forth in claim 1, wherein
   said ignition timing setting means is capable of setting an ignition timing in dependency on the revolution angle, the intake air quantity and the coolant temperature sensed by the crank angle sensor, the intake air flow sensor and the coolant temperature sensor.

3. The ignition timing control system for the engine as set forth in claim 1, wherein
   said complete firing judgment means and said delay setting means comprises ignition switching timing setting means.

4. The ignition timing control system for the engine as set forth in claim 1, wherein said complete firing judgment means is capable of receiving three parameters; namely a crank pulse sensed by the crank angle sensor and discriminated by crank pulse discrimination means, the engine speed calculated by engine speed calculation means in dependency on said angular velocity calculated by said angular velocity calculation means in response to a crank pulse detected by said crank angle sensor, and a coolant temperature sensed by the coolant temperature sensor and calculated by coolant temperature calculation means to thereby judge the engine to be in a complete firing state.

5. The ignition timing control system for the engine as set forth in claim 3, further comprising a first output from said ignition switching timing setting means is delivered to ignition timing calculation means and a second output from said ignition switching timing setting means is delivered to ignition drive means, said ignition timing calculation means being operative to receive said angular velocity calculated by a crank pulse detected by said crank angle sensor in addition to said first output to calculate said ignition timing to output the ignition time thus calculated to timer means, said timer means being operative to receive said crank pulse and said ignition timing to output an ignition signal to said drive means.

6. An ignition timing control system for an engine having a crank angle sensor for producing a crank pulse representing a predetermined crank angle of the engine, an intake air flow sensor for detecting an intake air of the engine, a coolant temperature sensor for detecting a temperature of the engine, engine speed calculation means responsive to the crank pulse for calculating an engine speed, and engine load calculation means responsive to the intake air and the engine speed for calculating an engine load, comprising:

ignition timing setting means responsive to said engine speed and said engine load for setting an ignition timing from a timing map;

complete firing judgment means responsive to said engine speed for judging complete firing in said engine and for producing a discrimination signal; and delay means responsive to said discrimination signal for delaying a point to switch a fixed ignition timing to a predetermined ignition timing set by said ignition timing setting means for a predetermined time depending on said temperature of the engine.

7. The system according to claim 6, wherein said engine load calculation means is adapted to produce a signal corresponding to a fundamental fuel injection amount.

8. The system according to claim 6, wherein said crank angle sensor includes a crank rotor with a plurality of projections mounted on a crank shaft of the engine and an electromagnetic pickup placed against said projections of the crank rotor, at least one of said projections indicating said fixed ignition timing.

9. The system according to claim 6, further comprising:

correction quantity calculation means responsive to said coolant temperature for calculating an ignition timing correction quantity; and said ignition timing setting means further responsive to said ignition timing correction quantity for setting the ignition timing.

10. The system according to claim 6, further comprising:

crank pulse discrimination means for discriminating said crank pulse from said crank angle sensor to produce a discriminated crank pulse; and angular velocity calculation means responsive to said discriminated crank pulse for calculating an angular velocity of the engine, so that said engine speed calculation means is capable of calculating said engine speed in dependency on said angular velocity.

11. The system according to claim 10, further comprising:

ignition time calculation means for calculating an ignition time corresponding to said predetermined ignition timing in dependency on said angular velocity.

12. The system according to claim 6, wherein said delay means is adapted to provide said predetermined time which decreases as said temperature increases.

13. The system according to claim 12, wherein said delay means is adapted to set said predetermined time which is a minimum value when said temperature is over about 60° C.

14. The system according to claim 12, wherein said delay means is adapted to set said predetermined time which is fixed at a maximum value when said temperature is less than about −20° C.

* * * * *